(12) United States Patent
Al-Nakhli

(10) Patent No.: US 10,151,186 B2
(45) Date of Patent: Dec. 11, 2018

(54) TRIGGERING AN EXOTHERMIC REACTION FOR RESERVOIRS USING MICROWAVES

(71) Applicant: Saudi Arabian Oil Company, Dhahran (SA)

(72) Inventor: Ayman R. Al-Nakhli, Dammam (SA)

(73) Assignee: Saudi Arabian Oil Company, Dhahran (SA)

(*) Notice: Subject to any disclaimer, the term of this patent is extended or adjusted under 35 U.S.C. 154(b) by 44 days.

(21) Appl. No.: 15/342,314

(22) Filed: Nov. 3, 2016

(65) Prior Publication Data
US 2017/0130568 A1 May 11, 2017

Related U.S. Application Data

(60) Provisional application No. 62/251,609, filed on Nov. 5, 2015.

(51) Int. Cl.
*E21B 43/26* (2006.01)
*E21B 43/24* (2006.01)
(Continued)

(52) U.S. Cl.
CPC .......... *E21B 43/2405* (2013.01); *C09K 8/524* (2013.01); *C09K 8/536* (2013.01);
(Continued)

(58) Field of Classification Search
None
See application file for complete search history.

(56) References Cited

U.S. PATENT DOCUMENTS

| 4,178,993 A | 12/1979 | Richardson et al. |
| 4,219,083 A | 8/1980 | Richardson et al. |

(Continued)

FOREIGN PATENT DOCUMENTS

| DE | 19543534 | 2/1997 |
| DE | DE19543534 | 2/1997 |

(Continued)

OTHER PUBLICATIONS

Machine Translation for German Application No. DE19543534 C1; Application published Feb. 20, 1997; (1-9) Translation obtained Apr. 17, 2017.

(Continued)

*Primary Examiner* — Angela M DiTrani Leff
(74) *Attorney, Agent, or Firm* — Bracewell LLP; Constance G. Rhebergen; Kevin R. Tamm

(57) ABSTRACT

Compositions and methods for triggering an exothermic reaction of an exothermic reaction component. A method includes the steps of mixing the exothermic reaction component in an aqueous solution to achieve a pre-selected solution pH, where the aqueous solution operably delays triggering of the exothermic reaction upon reaching a predetermined temperature of a hydrocarbon-bearing formation; disposing the exothermic reaction component within the hydrocarbon-bearing formation; applying microwaves to the exothermic reaction component, where the microwaves are operable to trigger the exothermic reaction of the exothermic reaction component; and generating heat and gas in situ by the exothermic reaction to increase pressure and temperature of the hydrocarbon-bearing formation proximate the exothermic reaction component.

39 Claims, 6 Drawing Sheets

(51) Int. Cl.
| | |
|---|---|
| *C09K 8/524* | (2006.01) |
| *E21B 43/267* | (2006.01) |
| *E21B 47/06* | (2012.01) |
| *C09K 8/536* | (2006.01) |
| *C09K 8/66* | (2006.01) |
| *C09K 8/70* | (2006.01) |
| *C09K 8/84* | (2006.01) |
| *C09K 8/92* | (2006.01) |
| *E21B 37/00* | (2006.01) |

(52) U.S. Cl.
CPC .............. *C09K 8/665* (2013.01); *C09K 8/70* (2013.01); *C09K 8/845* (2013.01); *C09K 8/92* (2013.01); *E21B 43/26* (2013.01); *E21B 43/267* (2013.01); *E21B 47/065* (2013.01); *E21B 37/00* (2013.01)

(56) References Cited

U.S. PATENT DOCUMENTS

| | | | |
|---|---|---|---|
| 4,232,741 | A | 11/1980 | Richardson et al. |
| 4,330,037 | A * | 5/1982 | Richardson .............. C09K 8/60 166/250.01 |
| 4,482,016 | A | 11/1984 | Richardson |
| 5,082,054 | A | 1/1992 | Kiamanesh |
| 5,308,650 | A | 5/1994 | Krummel et al. |
| 6,035,933 | A | 3/2000 | Khalil et al. |
| 6,176,313 | B1 | 1/2001 | Guillaume et al. |
| 7,461,693 | B2 | 12/2008 | Considine et al. |
| 8,008,067 | B2 | 8/2011 | Geddes et al. |
| 8,122,950 | B2 | 2/2012 | Daniel et al. |
| 8,132,628 | B2 | 3/2012 | Sanders et al. |
| 8,215,393 | B2 | 7/2012 | MacKay et al. |
| 8,365,823 | B2 | 2/2013 | Dreher, Jr. et al. |
| 8,464,789 | B2 | 6/2013 | Banerjee et al. |
| 9,334,721 | B2 | 5/2016 | Al Dahlan et al. |
| 9,488,042 | B2 | 11/2016 | Al-Nakhli et al. |
| 2007/0215345 | A1 | 9/2007 | Lafferty et al. |
| 2009/0107680 | A1 | 4/2009 | Surjaatmadja |
| 2009/0260818 | A1 | 10/2009 | Daniel et al. |
| 2010/0252267 | A1 | 10/2010 | Harris et al. |
| 2010/0263867 | A1 * | 10/2010 | Horton .................. C09K 8/035 166/292 |
| 2013/0126164 | A1 | 5/2013 | Sweatman et al. |
| 2013/0126169 | A1 * | 5/2013 | Al-Nakhli .............. E21B 43/26 166/300 |
| 2013/0180720 | A1 * | 7/2013 | Al-Dahlan ............ E21B 43/166 166/307 |
| 2014/0069647 | A1 | 3/2014 | Daly |
| 2014/0090839 | A1 | 4/2014 | Al-Nakhli et al. |
| 2014/0290951 | A1 * | 10/2014 | Al-Taq .................. E21B 37/06 166/300 |
| 2014/0357893 | A1 | 12/2014 | Peters |
| 2015/0114646 | A1 | 4/2015 | Price Hoelscher et al. |
| 2015/0175879 | A1 | 6/2015 | Al-Nakhli et al. |
| 2015/0300142 | A1 | 10/2015 | Al-Nakhli et al. |
| 2015/0300143 | A1 | 10/2015 | Al-Nakhli et al. |
| 2016/0032654 | A1 | 2/2016 | Rashid et al. |
| 2016/0264859 | A1 | 9/2016 | Al-Nakhli et al. |
| 2016/0319182 | A1 | 11/2016 | Al-Nakhli et al. |

FOREIGN PATENT DOCUMENTS

| | | |
|---|---|---|
| WO | WO2015094159 A1 | 6/2015 |
| WO | WO2015155589 A1 | 10/2015 |

OTHER PUBLICATIONS

Al-Nakhli, "Chemically-Induced Pressure Pulse: A New Fracturing Technology for Unconventional Reservoirs," SPE-172551-MS, presented at SPE Middle East Oil & Gas Show and Conference, Manama, Bahrain, Mar. 8-11, 2015.

H. Abass, "Oriented Fracturing: A New Technique to Hydraulically Fracture an Openhole Horizontal Well," SPE-124483-MS, SPE Annual Technical Conference and Exhibition, Oct. 4-7, New Oleans, LA 2009.

Ai-Nakhli, Copy of related U.S. Appl. No. 15/205,994 filed Jul. 8, 2016, titled "Compositions for Enhanced Fracture Cleanup Using Redox Treatment.".

Al-Nakhli, Copy of related U.S. Appl. No. 62/251,611, filed Nov. 5, 2015, titled "Methods and Apparatus for Spatially-Oriented Chemically-Induced Pulsed Fracturing in Reservoirs".

International Search Report and Written Opinion for related PCT application PCT/US2016/060247 dated Jan. 20, 2017.

International Search Report and Written Opinion for related PCT application PCT/US2016/060267 dated Jan. 26, 2017.

Cuderman, J.F. et al., "Tailored-Pulse Fracturing in Cased and Perforated Boreholes", SPE 15253, 1986, pp. 1-10, Society of Petroleum Engineers.

U.S. Appl. No. 15/385,105; filed Dec. 20, 2016 "Non-Acidic-Exothermic Sandstone Stimulation Fluids" 004159.005692; pp. 1-28; figures 1-3.

* cited by examiner

TRIGGERING AN EXOTHERMIC REACTION FOR RESERVOIRS USING MICROWAVES

PRIORITY

This application is a non-provisional application of and claims priority to and the benefit of U.S. Prov. App. Ser. No. 62/251,609, filed Nov. 5, 2015, the entire disclosure of which is incorporated here by reference.

FIELD

This disclosure relates to systems and methods for triggering an exothermic reaction component. More specifically, this disclosure relates to systems and methods for triggering an exothermic reaction component with microwaves to increase production from a hydrocarbon-bearing reservoir.

BACKGROUND

Hydraulic fracturing fluids containing proppants are used extensively to enhance productivity from hydrocarbon-bearing reservoir formations, including carbonate and sandstone formations. During hydraulic fracturing operations, a fracturing treatment fluid is pumped under a pressure and rate sufficient for cracking the formation of the reservoir and creating fractures. Fracturing operations usually consist of three main stages including a pad fluid stage, a proppant fluid stage, and an overflush fluid stage. The pad fluid stage typically consists of pumping a pad fluid into the formation. The pad fluid is a viscous, gelled fluid which initiates and propagates the fractures. The proppant fluid stage involves pumping a proppant fluid into the fractures of the formation. The proppant fluid contains proppants mixed with a viscous, gelled fluid or a visco-elastic surfactant fluid. The proppants in the proppant fluid are lodged in the fractures and create conductive fractures through which hydrocarbons flow. The final stage, the overflush stage, includes pumping a viscous gelled fluid into the fractures to ensure the proppant fluid is pushed inside the fractures. While the three stages have different aims, all three make use of highly viscous and/or gelled fluids to achieve those aims.

A downside of the traditional method is that a high volume of gelled or polymeric materials can be left behind in the fractures. The gelled materials can be concentrated around the proppant in the fractures or can be freely mobile in the fractures. The gelled material acts to block the fractures reducing the fracture conductivity of hydrocarbons. The hydrocarbons which flow from the reservoir formation are unable to move the gelled materials. Traditional methods for cleaning the fractures involve viscosity breakers or other elements to break down the fluid. These traditional methods suffer from an inability to completely cleanup the fractures, leaving residual viscous material and reduced conductivity.

In addition, unconventional gas wells require an extensive fracturing network to increase the stimulated reservoir volume and to create commercially valuable producing wells. One commonly employed technique is multi-stage hydraulic fracturing in horizontal wells, which is very costly and may not provide the required stimulated reservoir volume. Moreover, traditional hydraulic fracturing methods use huge amounts of damaging gels pumped downhole as noted previously. Even with traditional breakers, significant amounts of polymeric material cannot be recovered and, therefore, fracture conductivity is reduced.

Therefore, systems and methods that increase the stimulated reservoir volume of unconventional gas wells are desired to increase production from hydrocarbon-bearing reservoirs. A method that minimizes the volume of fracturing fluid required, while increasing the volume of fluid recovered regardless of the type of reservoir or well is also desired.

SUMMARY

The present disclosure provides systems and methods of using microwaves to trigger an exothermic reaction to produce heat and gas in situ, or within a hydrocarbon-bearing formation. The technology can be applied to using microwaves to trigger an exothermic reaction component downhole to induce a pressure pulse that creates fractures. Additionally, the technology can be applied to using microwaves to trigger an exothermic reaction component downhole to produce heat, for example to reduce the viscosity of a viscous liquid, or to increase solvation of another downhole reactant. Exothermic reactions are commonly triggered by either applying an acid to reduce pH or by designing component concentrations to react at well temperatures. However, systems and methods for triggering an exothermic reaction using microwaves is more convenient and less time consuming. Chemical compositions can be injected downhole and then triggered using microwaves.

Embodiments of the systems and methods are designed to execute downhole exothermic reactions using microwave energy to create downhole fractures, improve permeability, improve heavy oil production, and clean up the well. Pressure pulses created using systems and methods of the present disclosure can be either spatially-oriented in a pre-determined fashion, or non-spatially-oriented.

One advantage of using microwaves to trigger an exothermic reaction downhole includes substantially avoiding any premature reaction(s). In-situ reservoir temperatures can trigger exothermic reactions prematurely. Injecting acids to trigger an exothermic reaction can reduce the efficiency of the reaction, as the acid dilutes certain reactant concentrations. In embodiments of the present disclosure, chemicals can be safely placed downhole and then triggered to react using microwaves. The method of creating an in-situ pressure pulse is used to increase the stimulated reservoir volume in unconventional reservoirs, and ultimately enhance the commerciality of unconventional tight gas development. Embodiments of the disclosure will also enable the production of heavy oil and tar mats, the avoidance of precipitation of paraffins and asphaltenes, and wellbore and fracture cleanup.

Therefore, disclosed here is a method for triggering an exothermic reaction of an exothermic reaction component, the method including the steps of: mixing the exothermic reaction component in an aqueous solution to achieve a pre-selected solution pH, where the aqueous solution operably delays triggering of the exothermic reaction upon reaching a pre-determined temperature of a hydrocarbon-bearing formation; disposing the exothermic reaction component within the hydrocarbon-bearing formation; applying microwaves to the exothermic reaction component, where the microwaves are operable to trigger the exothermic reaction of the exothermic reaction component; and generating heat and gas in situ by the exothermic reaction to increase pressure and temperature of the hydrocarbon-bearing formation proximate the exothermic reaction component.

In some embodiments, the method further includes the steps of mixing the exothermic reaction component in the aqueous solution, where the exothermic reaction component is operable to react to generate a pressure pulse; mixing the aqueous solution with a viscous fluid component to form a fracturing fluid, the viscous fluid component operable to fracture the hydrocarbon-bearing formation to create fractures, and the fracturing fluid further comprising a proppant component, the proppant component carried to the fractures by the viscous fluid component, the proppant component comprises a proppant, the proppant operable to hold open the fractures; injecting the fracturing fluid into a wellbore in the hydrocarbon-bearing formation to create the fractures; and generating the pressure pulse by applying microwaves to the exothermic reaction component, such that the pressure pulse is operable to create auxiliary fractures, where the auxiliary fractures create a fracture network, where the fracture network increases stimulated reservoir volume.

In some embodiments, the method further comprises the step of: fracturing the hydrocarbon-bearing formation with a fracturing fluid to generate fractures, the fracturing fluid comprising: a viscous fluid component, the viscous fluid component operable to fracture the hydrocarbon-bearing formation to create the fractures leaving behind a residual viscous material in the fractures, the viscous fluid component having a viscosity; a proppant component, the proppant component comprising a proppant, the proppant operable to hold open the fractures, where the proppant component is carried to the fractures by the viscous fluid component; and a cleanup fluid, the cleanup fluid comprising: the exothermic reaction component, where the step of generating heat and gas in situ by the exothermic reaction to increase the pressure and temperature of the hydrocarbon-bearing formation proximate the exothermic reaction component is operable to reduce a viscosity of the residual viscous material to create a reduced viscosity material, the reduced viscosity material operable to flow from the hydrocarbon-bearing formation.

In some embodiments, the method further comprises injecting an aqueous preflush solution into the hydrocarbon-bearing formation comprising the exothermic reaction component, the exothermic reaction component comprising ammonium and nitrite ion containing compounds, where at least one of the ammonium and nitrite ion containing compounds is encapsulated with an erodible coating such that reaction between the ammonium and nitrite ion containing compounds is delayed as the ammonium and nitrite containing compounds migrate to within the hydrocarbon-bearing formation; applying microwaves to the aqueous preflush solution to trigger the exothermic reaction of the exothermic reaction component within the aqueous preflush solution; injecting into the hydrocarbon-bearing formation an acid-free well stimulation composition comprising sodium hydroxide, ammonium containing compounds and nitrite containing compounds, said acid-free well stimulation composition being operable to dissolve at least a portion of the hydrocarbon-bearing formation; and after allowing the acid-free well stimulation composition to react with the hydrocarbon-bearing formation, then injecting an overflush solution comprising brine into the hydrocarbon-bearing formation such that the overflush solution stops the reaction between the acid-free well stimulation composition and the hydrocarbon-bearing formation.

In some embodiments, the exothermic reaction component comprises an ammonium containing compound and a nitrite containing compound. In some embodiments, the pre-selected solution pH is between about 10 and about 14. In other embodiments, the pre-selected solution pH is between about 10 and about 12. In some embodiments, the pre-determined temperature of the hydrocarbon-bearing formation is in a range between about 48.8° C. (120° F.) and about 121.1° C. (250° F.). Still in other embodiments, the ammonium containing compound is selected from the group consisting of: ammonium chloride, ammonium bromide, ammonium nitrate, ammonium sulfate, ammonium carbonate, and ammonium hydroxide. In still yet other embodiments, the nitrite containing compound is selected from the group consisting of: sodium nitrite and potassium nitrite. In some embodiments, the ammonium containing compound comprises ammonium chloride and the nitrite containing compound comprises sodium nitrite.

In other embodiments, the concentration of the ammonium containing compound is between about 0.5 molar and about 10 molar. Still in other embodiments, the concentration of the nitrite containing compound is between about 0.05 molar and about 12 molar. In some embodiments, the ratio of the ammonium containing compound to the nitrite containing compound is about 1:1 on a molar basis. Still in other embodiments, the step of applying microwaves to the exothermic reaction component is carried out for less than about 10 minutes to trigger the exothermic reaction of the exothermic reaction component, and the microwaves do not significantly increase the temperature of the exothermic reaction component before triggering the exothermic reaction.

Still in other embodiments, the step of applying microwaves to the exothermic reaction component is carried out for less than about 1 minute to trigger the exothermic reaction of the exothermic reaction component and the microwaves do not significantly increase the temperature of the exothermic reaction component before triggering the exothermic reaction. In some embodiments, the exothermic reaction component comprises an ammonium containing compound and a nitrite containing compound. In other embodiments, the pressure pulse is between about 500 psi and about 50,000 psi. Still in other embodiments, the pressure pulse creates the auxiliary fractures in less than about 10 seconds. Still in other embodiments, the pressure pulse creates the auxiliary fractures in less than about 5 seconds. In some embodiments, the step of fracturing the hydrocarbon-bearing formation with a fracturing fluid to generate fractures further comprises the step of forming auxiliary fractures and a fracture network.

In some embodiments of the method, the cleanup fluid comprises an ammonium containing compound and a nitrite containing compound. Still in some other embodiments, the cleanup fluid comprises ammonium chloride and the nitrite containing compound comprises sodium nitrite. In some embodiments, the molar ratio of the ammonium containing compound to the nitrite containing compound is between about 1.1:1 and 1:1.1. Still in other embodiments, at least one of the ammonium containing compound and the nitrite containing compound comprise a polymer coating selected from the group consisting of: guar, chitosan, and polyvinyl alcohol.

In some other embodiments, the erodible coating encapsulating at least one of the ammonium containing compound and the nitrite containing compound is selected from the group consisting of: carboxymethyl cellulose and xanthan. In some embodiments, the ammonium containing compound is ammonium chloride. In some embodiments, the nitrite containing compound is sodium nitrite. Still in other embodiments, the reaction between the ammonium containing compounds and nitrite containing compounds is operable to increase temperature within the hydrocarbon-bearing formation by between about 50° C. (122° F.) and 100° C. (212° F.).

Additionally disclosed is a system for triggering an exothermic reaction of an exothermic reaction component in a hydrocarbon-bearing reservoir, the system comprising: a temperature detecting device operable to detect an in situ temperature of the hydrocarbon-bearing reservoir; an exothermic reaction component in an aqueous solution with a pre-selected solution pH, where the aqueous solution operably delays triggering of the exothermic reaction upon reaching the in situ temperature of the hydrocarbon-bearing reservoir; and a microwave application unit for in situ application of microwaves to the exothermic reaction component, where the microwaves are operable to trigger the exothermic reaction of the exothermic reaction component in situ without significantly raising the temperature of the exothermic reaction component before triggering of the exothermic reaction, the exothermic reaction generating heat and gas in situ by the exothermic reaction to increase pressure and temperature of the hydrocarbon-bearing reservoir.

In some embodiments of the system, the exothermic reaction component comprises an ammonium containing compound and a nitrite containing compound. Still in other embodiments of the system, the pre-selected solution pH is between about 10 and about 14. Still in other embodiments, the pre-selected solution pH is between about 10 and about 12. In other embodiments, the ammonium containing compound is selected from the group consisting of: ammonium chloride, ammonium bromide, ammonium nitrate, ammonium sulfate, ammonium carbonate, and ammonium hydroxide. In yet other embodiments, the nitrite containing compound is selected from the group consisting of: sodium nitrite and potassium nitrite. In still other embodiments, the ammonium containing compound comprises ammonium chloride and the nitrite containing compound comprises sodium nitrite. In other embodiments, the concentration of the ammonium containing compound is between about 0.5 molar and about 10 molar.

In still some other embodiments, the concentration of the nitrite containing compound is between about 0.05 molar and about 12 molar. In other embodiments, the ratio of the ammonium containing compound to the nitrite containing compound is about 1:1 on a molar basis. In other embodiments, the microwave application unit applies microwaves to the exothermic reaction component for less than about 10 minutes to trigger the exothermic reaction of the exothermic reaction component. Still in other embodiments, the microwave application unit applies microwaves to the exothermic reaction component and is carried out for less than about 1 minute to trigger the exothermic reaction of the exothermic reaction component.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

DETAILED DESCRIPTION

While the disclosure will be described with several embodiments, it is understood that one of ordinary skill in the relevant art will appreciate that many examples, variations and alterations to the apparatus and methods described here are within the scope and spirit of the disclosure. Accordingly, the embodiments of the disclosure described here are set forth without any loss of generality, and without imposing limitations, on the claims.

Certain exothermic reactions for use in oil wells and reservoirs can be triggered by applying either an acid to reduce the pH of a solution comprising an exothermic reaction component, or by heating a solution comprising an exothermic reaction component to the well temperature. The present disclosure provides a new method of triggering exothermic reaction components using microwaves in situ, or in any one of a well, wellbore, reservoir, or formation. Microwaves can be used as a method of triggering reactive chemicals downhole and to induce pressure pulses that create fractures. Microwaves can be applied alone, or in combination with acid and heat.

Figure 1:
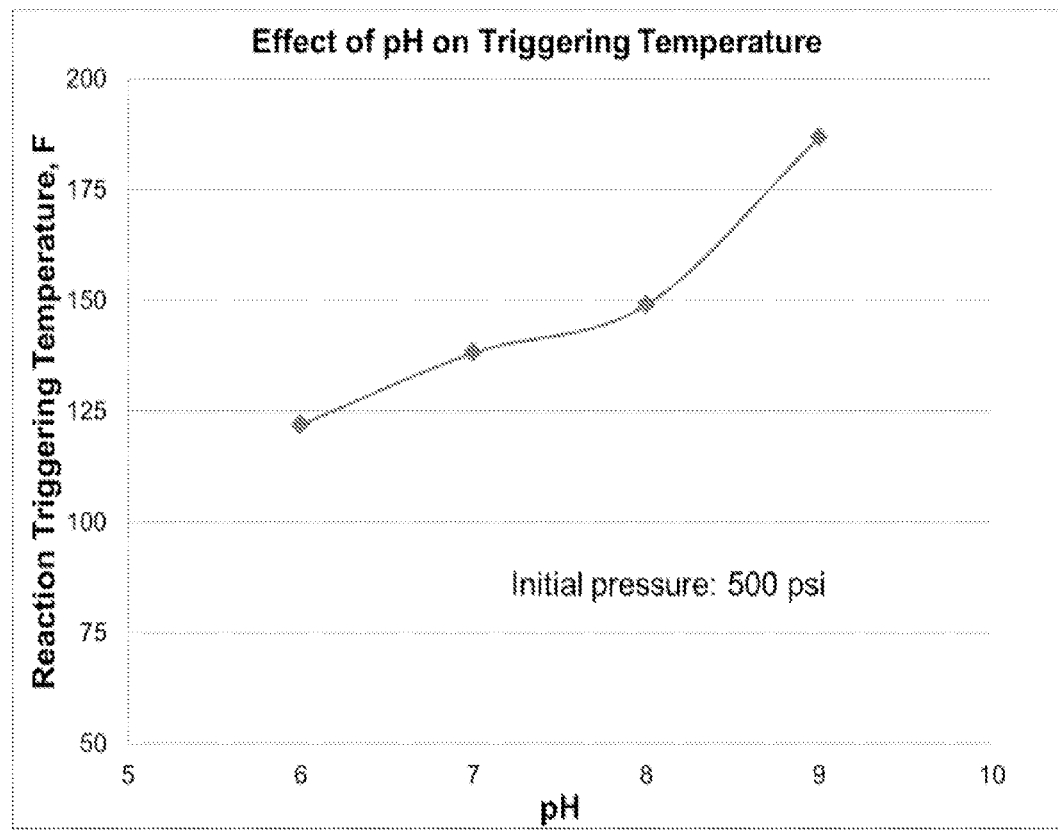
FIG. 1 is a graph showing the effect of solution pH on the exothermic reaction triggering temperature at an initial pressure of 500 pounds per square inch (psi).

Referring now to FIG. 1, a graph showing the effect of solution pH on the exothermic reaction triggering temperature at an initial pressure of 500 psi is provided. As can be seen, at an initial pressure of 500 pounds per square inch (psi), as the pH of the exothermic reaction component increases, the reaction triggering temperature in degrees Fahrenheit also increases. Thus, at higher pH, a higher well or wellbore temperature would be required to trigger an exothermic reaction.

Figure 2:
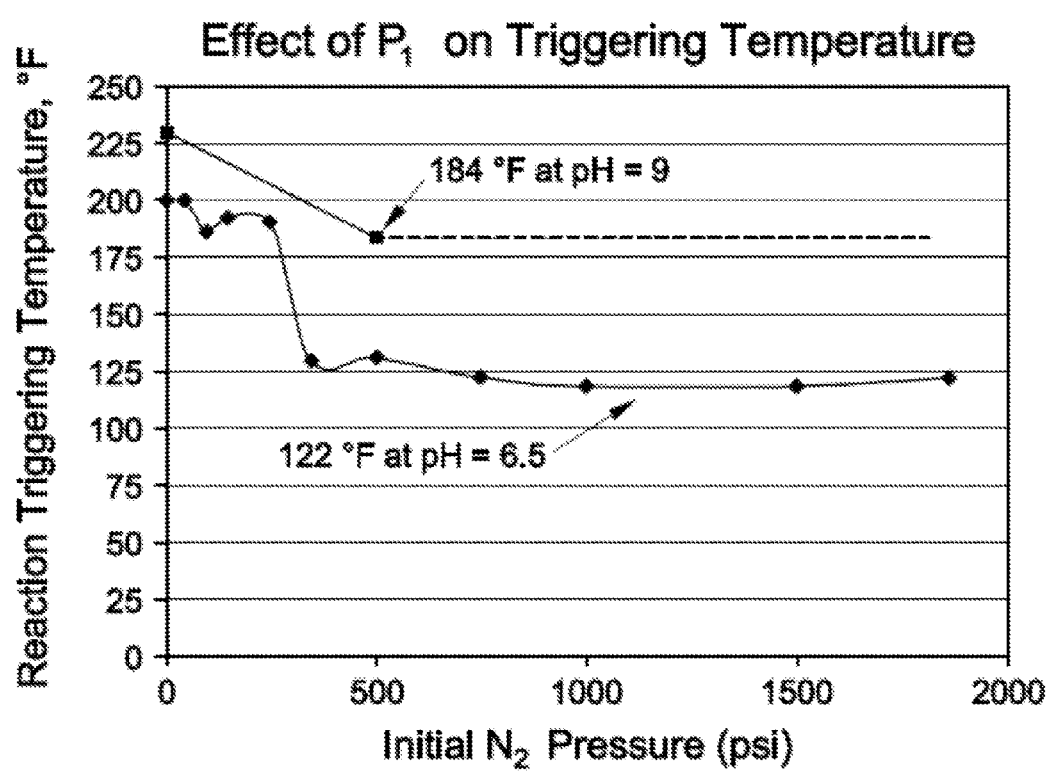
FIG. 2 is a graph showing the effect of initial pressure on triggering temperature for solutions of exothermic reaction component at pH 9 and pH 6.5.

Referring now to FIG. 2, a graph showing the effect of initial pressure on triggering temperature for solutions of exothermic reaction component at pH 9 and pH 6.5 is provided. As can be seen, as the initial pressure increases, the triggering temperature for the exothermic reaction component decreases. Similar to FIG. 1, at a higher pH, a higher reaction triggering temperature is required.

Figure 3:
FIG. 3 is a graphic representation of one example experiment in which microwaves were applied to an exothermic reaction component to trigger an exothermic reaction, and the solution temperature reached 86° C. (186.8° F.) by the reaction.

Referring now to FIG. 3, a graphic representation is provided of one example experiment in which microwaves were applied to an exothermic reaction component and the solution temperature reached 186.8° F., once the reaction was triggered. The exothermic reaction was triggered by microwaves from a microwave oven, and as the reaction took place, the temperature increased from room temperature, about 75° F., to about 187° F. Without being bound by any theory or explanation, it is believed that the reaction is mainly triggered by excitation that is provided by microwave radiation to the exothermic reaction component. It is believed that heating does not play a major role in initiating the exothermic reaction. The reaction was triggered in about only 8 seconds in a conventional strength microwave oven, and afterward the temperature increase caused by the reaction was measured as shown in FIG. 3. Microwave power of about 1,000 Watts (W) or greater is enough to quickly trigger the reaction of the exothermic reaction component.

The reaction, when triggered using microwaves, is triggered at about room temperature (75° F.), in the experiment shown in FIG. 3. Because microwaves were applied for only about 8 seconds in a conventional strength microwave oven, the solution did not have time to heat significantly. Thus, microwave excitation is largely responsible for the triggering of the reaction. The pH was at 6.5. However, when the same solution is triggered by conventional (non-microwave) heating, the reaction would be triggered at about 200° F. (see FIG. 2). The reaction generally proceeded for about 10 minutes to completion. The solution concentration was 3 molar (M) of both sodium nitrite and ammonium chloride with pH of 6.5. No other additives were used. The exothermic reaction is triggered by microwave excitation even prior to reaching the triggering temperature. In an enclosed environment, such as a hydrocarbon-bearing reservoir, pressure from the exothermic reaction builds into a wave, or pressure pulse, that is strong enough to exceed the formation fracture pressure.

In some embodiments, merely introducing the exothermic reaction component into a wellbore or hydrocarbon-bearing formation will not generate the pressure pulse, because the wellbore or hydrocarbon-bearing reservoir temperature environment is less than the triggering temperature of the exothermic reaction component. The microwaves are used to trigger the reaction between all of the exothermic reaction component. The exothermic reaction component has been tested without using microwaves, heat, or acid to trigger the exothermic reaction. The reaction without any triggering mechanism takes around 10 days to complete. Using microwave triggering, the exothermic reaction of the exothermic reaction component can be triggered, in some embodiments, in under 1 minute or under 10 seconds, depending on the microwave power applied, and this will create a pressure pulse in situ. In some embodiments, the exothermic reaction of the exothermic reaction component is an acid-base reaction, which takes place in aqueous solution.

Figure 4:
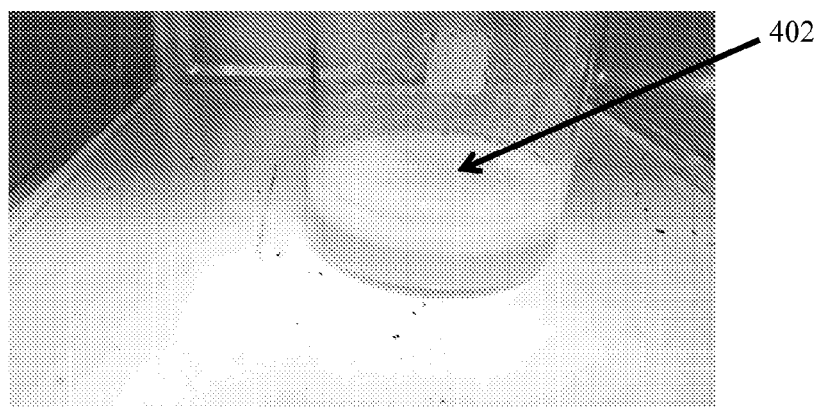
FIG. 4 is a graphic representation of the exothermic reaction component of FIG. 3 showing the generation of gas in an exothermic reaction.

Referring now to FIG. 4, a graphic representation is provided of the exothermic reaction component of FIG. 3, showing the generation of gas in an exothermic reaction. Bubbles 402 show the generation of gas produced during the exothermic reaction along with the generation of heat. The microwave oven managed to trigger the reaction in about only 8 seconds. This is highly advantageous as triggering of the exothermic reaction component by acid addition or heating by in situ well temperature consume significant time. Triggering exothermic reactions downhole using microwaves, therefore, provides better efficiency and avoids any premature reaction.

One advantage of using microwaves to trigger the exothermic reaction downhole is to avoid any premature reaction of the exothermic reaction component. In-situ reservoir temperatures can trigger the reaction prematurely, depending on the temperature and pressure of the reservoir and the pH of the exothermic reaction component. Injecting acids to trigger the reaction can reduce the efficiency of the reaction, as the acid dilutes reactant concentrations. In embodiments of the present disclosure, chemicals can be safely placed downhole and then subsequently triggered using microwaves at a desired, pre-determined time.

Figure 5:
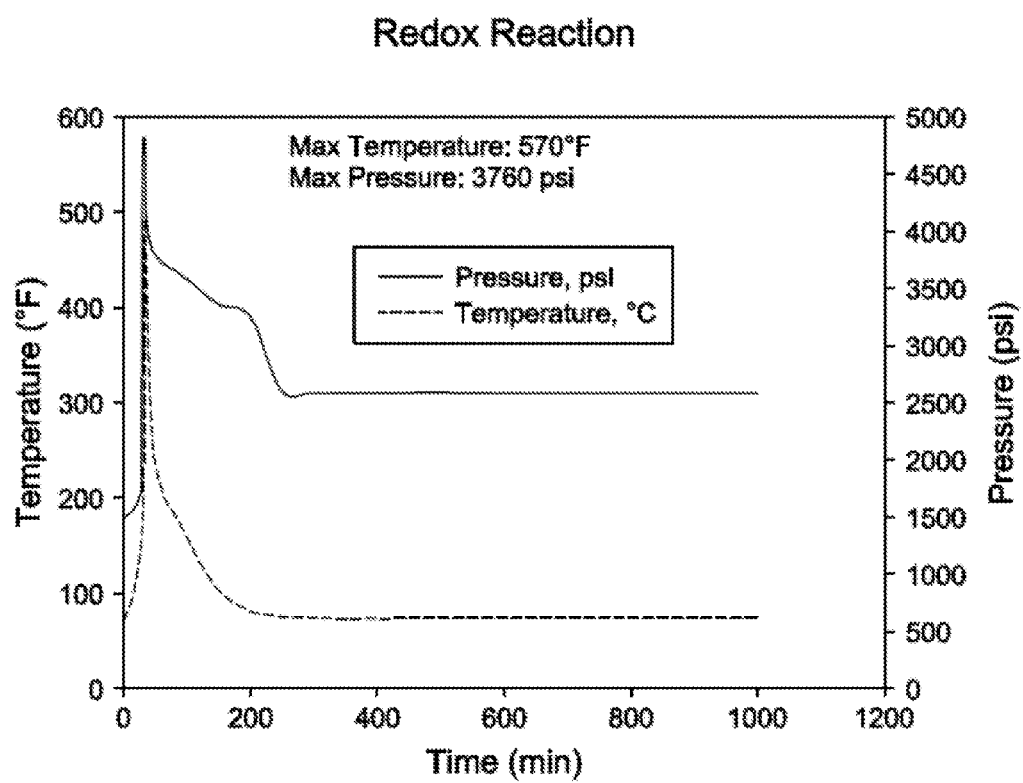
FIG. 5 is a graphic representation of an exothermic reaction component creating a pressure pulse at increased temperature.

Referring now to FIG. 5, a graphic representation is shown of an exothermic reaction component creating a pressure pulse at increased temperature. Embodiments of methods of creating an in-situ pressure pulse increase the stimulated reservoir volume in unconventional reservoirs, and ultimately enhance the commercial value of unconventional tight gas development, by creating any one of or any combination of fractures, microfractures, and fracture networks. An aqueous solution of an exothermic reaction component was prepared from 3M $NH_4Cl$ and 3M $NaNO_2$. The aqueous solution was placed in an autoclave reactor at room temperature and an initial pressure of 1,000 pounds per square inch (psi). The reaction was triggered at about 49° C. (120° F.), see FIG. 5. Due to the reaction, the temperature in the reactor reached a temperature of 299° C. (570° F.) and a pressure of 3,760 psi, see FIG. 5.

Figure 6:
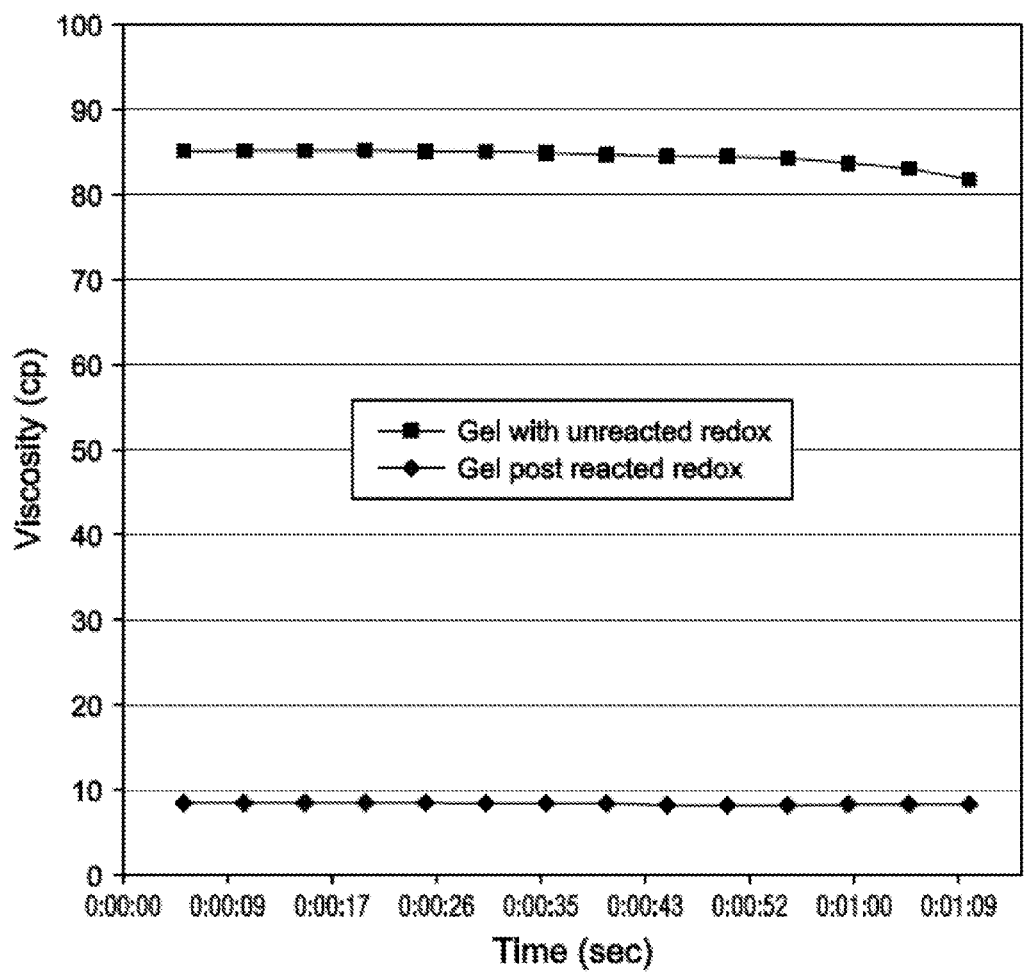
FIG. 6 is a graphic representation of an exothermic reaction component reducing the viscosity of a gel, used to carry a proppant, for removal of the gel from a well, wellbore, formation, or reservoir.

Certain embodiments of the present disclosure enable production of heavy oil and tar mats, removal of precipitation of paraffins and asphaltenes, and wellbore and fracture cleanup by viscosity reduction of fluids. Referring now to FIG. 6, a graphic representation is provided of an exothermic reaction component reducing the viscosity of a gel used to carry a proppant for removal of the gel from a well, wellbore, formation, or reservoir. An exothermic reaction component of a cleanup fluid consisting of 3M $NH_4Cl$ and 3M $NaNO_2$ was added to a solution of 1% by volume guar at room temperature, see FIG. 6. The exothermic reaction component was triggered by heat. The viscosity of the solution was measured before, during, and after the reaction using a Chandler viscometer. Prior to reaction of the exothermic reaction component, the viscosity of the residual viscous material was 85 cP. FIG. 6 provides a representation of the viscosity following the reaction of the exothermic reaction component as the diamonds on the chart. The graph shows that the viscosity of the residual viscous material was reduced to less than 8.5 cP.

Embodiments of the present disclosure allow for adjustment of the initial exothermic reaction component pH to allow for adjustment of the temperature at which the exothermic reaction is triggered. For example, if the temperature of a reservoir was known to be T1, an exothermic reaction component could be designed to only react at T2, a temperature higher than T1, and microwaves could be applied to the exothermic reaction component in situ to trigger the exothermic reaction component, without significantly increasing the temperature of the exothermic reaction component.

Compositions and methods of the present disclosure are designed to execute a downhole exothermic reaction using microwave energy to create downhole fractures, improve permeability, improve heavy oil production, and clean up the well. The reaction produced is controllable according to temperature and pressure. One challenge in using exothermic reaction components is safely triggering the reaction and avoiding any premature reaction(s). Embodiments of compositions and methods of the present disclosure target this challenge where the reaction will be set to be triggered using microwave energy, which is applied after complete placement of the chemical compositions downhole.

Exothermic reactions can be set to be triggered by either using in-situ reservoir temperature in addition to or alternative to an acid, when injected downhole to create fracturing. However, using in-situ reservoir temperature can result in premature reactions. On the other hand, using acid to trigger the reaction will dilute the reactant concentrations and reduce the reaction efficiency, and therefore reduce generated pressure and temperature. Moreover, triggering the reaction using an acid can result in generating hazardous fumes. Triggering the reaction downhole using an acid or in-situ temperature is time consuming and can result in significant leak-off of the chemicals in the formation prior to reaction triggering. Another challenge is that acid can induce corrosion for the tanks and tubing.

On the other hand, compositions and embodiments of the present disclosure manage to trigger exothermic reactions using microwaves, and therefore improve the efficiency of the reaction, and avoid any premature reactions. Exothermic reactions can be injected safely downhole and triggered using microwaves, therefore, maximum efficiency will be achieved with no premature reaction(s) being expected. No hazardous fumes will be generated while using microwaves. Triggering the reaction using microwaves can minimize the leak-off of the reactants in the formation, as it takes only seconds to set off the reaction. Another advantage is that no corrosion will be induced when using microwaves to trigger the reaction compared to using acid.

In some embodiments, compositions and methods of the present disclosure will reduce the fracturing cost of unconventional reservoirs by at least 70%. Energy required for fracturing will be generated in-situ by the reaction, instead of by horse power generated by pumps, as in hydraulic fracturing. Embodiments of the present disclosure also significantly reduce the amount of water used for fracturing, and improve productivity of unconventional reservoirs. Certain methods and compositions will also enable fracturing high stress rocks, which is not viable through existing hydraulic fracturing methods. This will create a greater stimulated reservoir volume (SRV) than conventional hydraulic fracturing.

Notably, the exothermic chemical reaction of the present disclosure is triggered by inert processes such as increase in temperature, in addition to or alternative to a decrease in pH, in addition to or alternative to application of microwaves. In other words, the reaction is triggered in the absence of or without a propellant, spark, or firing, which makes the exothermic reaction component much safer to contain and apply in a hydrocarbon environment. No detonation is taking place in situ. Exothermic reactions in the current disclosure include Reduction-Oxidation (Redox) reactions to quickly produce heat and pressure, which is substantially different than detonation reactions. The exothermic reaction of appropriate exothermic reaction components can create a pressure pulse sufficient to fracture the formation, and a spatially-orienting tool can be used to orient the created fractures. One advantage presented by the safety of the exothermic reaction component and the ability to inject the reactants separately is that multiple fracturing pulses can be created in one run downhole. Crude oil downhole is not used as a reactant in the reactions of the present disclosure.

Examples of suitable microwave producing units for use with an optional microwave antenna can include those such as the VKP-7952 Klystron models produced by Communications & Power Industries (CPI)/Microwave Power Products (MPP), with headquarters at 607 Hansen Way Palo Alto, Calif. 94304, and microwave units produced by Industrial Microwave Systems, L.L.C, with headquarters at 220 Laitram Lane New Orleans, La. 70123. Modifications to these or similar systems can be made by those of ordinary skill in the art for optimum use within the systems and methods of the present disclosure. Microwave systems have been used in heavy oil recovery techniques using microwaves as thermal means to reduce oil viscosity for better oil mobility towards wells in heavy oil reservoirs. In embodiments of the present disclosure, microwaves can be generated downhole instead of, or in addition to, delivering the microwaves from a surface generator.

Example Applications

Viscous Fluid Cleanup

In one aspect, a method for improved hydrocarbon recovery from a formation due to cleanup of a residual viscous material is provided. The hydraulic fracturing operation fractures the formation using fracturing fluid to create fractures. Formations include sandstone and carbonate, for example.

The fracturing fluid includes a viscous fluid component and a proppant component. The viscous fluid component has a viscosity. The viscous fluid component is operable to increase the viscosity of the fracturing fluid. Viscous fluid components include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose. Guar-based fluids include hydroxypropyl guar, carboxymethyl guar, guar cross-linked boron ions from an aqueous borax/boric acid solution and guar cross-linked with organometallic compounds. Organometallic compounds include zirconium, chromium, antimony, and titanium salts. Gel oil-based fluids include aluminum phosphate-ester oil gels. In at least one embodiment, the viscous fluid component is an aqueous guar solution, having a concentration of guar gum between about 0.1% and about 15%, between about 0.1% and about 10%, between about 1% and about 10%, between about 2% and about 8%, and between about 4% and about 6%.

The proppant component includes a proppant. The proppants in the proppant fluid are lodged in the fractures and create conductive fractures through which hydrocarbons flow. Any proppants capable of holding open conductive fractures are suitable for use in the present embodiments. In some embodiments, the proppant component includes a viscous carrier fluid having a viscosity. Viscous carrier fluids include viscosified water-based fluids, non-viscosified water-based fluids, gel-based fluids, gel oil-based fluids, acid-based fluids, and foam fluids. Gel-based fluids include cellulose derivatives and guar-based fluids. Cellulose derivatives include carboxymethyl cellulose, hydroxyethyl cellulose, carboxymethyl hydroxyethyl cellulose, hydroxypropyl cellulose, and methyl hydroxyl ethyl cellulose. Guar-based fluids include hydroxypropyl guar, carboxymethyl guar, guar cross-linked boron ions from an aqueous borax/boric acid solution, and guar cross-linked with organometallic compounds. Organometallic compounds include zirconium, chromium, antimony, and titanium salts. Gel oil-based fluids include aluminum phosphate-ester oil gels.

In some embodiments, the hydraulic fracturing operation uses a one stage fracturing fluid, in which the fracturing fluid includes both the viscous fluid component and the proppant component, in which the viscous fluid component carries the proppant component to the fractures. In at least one embodiment of the present disclosure, the hydraulic fracturing operation uses a multi-stage fracturing fluid in which the viscous fluid component is injected into the formation, followed by the proppant component in the viscous carrier fluid. In some embodiments, the injection of the proppant component is followed by injection of additional viscous fluids to ensure the proppants are placed in the fractures. The additional viscous fluids have a viscosity. In some embodiments, the viscosity of the viscous fluid component, the viscous carrier fluid, and additional viscous fluids are the same. In some embodiments, the viscosity of the viscous fluid component, the viscous carrier fluid, and additional viscous fluids are different. The injection of the fracturing fluid ceases after the proppants are placed in the fractures and the fracturing fluid is allowed to seep from the fractures.

The hydraulic fracturing operation leaves residual viscous material in the fractures. Residual viscous materials include carboxymethyl cellulose, hydroxyethyl cellulose, carboxymethyl hydroxyethyl cellulose, hydroxypropyl cellulose, and methyl hydroxyl ethyl cellulose, guar gum, hydroxypropyl guar, carboxymethyl guar, guar cross-linked with boron, aluminum phosphate-ester oil gel, and guar cross-linked with organometallic compounds. Organometallic compounds include zirconium, chromium, antimony, and titanium salts. In some embodiments of the present disclosure, the residual viscous material is a gelled material. In some embodiments, the residual viscous material is a polymeric material. In at least one embodiment, the residual viscous material is guar gum. The residual viscous material has a viscosity greater than the fracturing fluid. In at least one embodiment, the residual viscous material is surrounding or adjacent to the proppants placed in the fractures.

The cleanup fluid acts, after the proppants have been placed in the fractures, to remove the residual viscous material. In one embodiment of the present disclosure, the cleanup fluid is mixed with the fracturing fluid. In at least one embodiment, where a multi-stage fracturing fluid is used, the cleanup fluid is a component of the fluids used at each stage of the hydraulic fracturing operation. In an alternate embodiment, the cleanup fluid is added only to the fluid of the final stage of the hydraulic fracturing operation. In some embodiments, the cleanup fluid is pumped to the fractured formation as a separate step following the hydraulic fracturing operation.

The cleanup fluid includes an optional acid precursor and an exothermic reaction component. The reaction of the exothermic reaction component results in a release of kinetic energy and thermal energy. The reaction of the exothermic reaction component generates heat and increases the pressure. As described previously, the exothermic reaction can be triggered by microwaves applied to the exothermic reaction component once it is disposed downhole. The microwaves can be applied and trigger the reaction in under about 10 seconds, depending on the level of microwave energy applied to the exothermic reaction component.

The generated heat from the exothermic reaction increases the temperature of the surrounding fluids, including fracturing fluid remaining in the fractures and residual viscous material. The increase in temperature reduces the viscosity of the fracturing fluid. The increase in temperature reduces the viscosity of the residual viscous material left in the fractures to create a reduced viscosity material.

The reduced viscosity material flows from the fractures of the formation to the wellbore. The increase in pressure provides lift energy to push the reduced viscosity materials through the wellbore toward the surface. The removal of the residual viscous material increases the conductivity of the fractures. Increased conductivity of the fractures increases seepage of the fracturing fluid, improves fracturing efficiency, minimizes need for additional fracturing jobs, minimizes time between fracturing and well production, and increases hydrocarbon flow, which translates to increased hydrocarbon recovery.

The optional acid precursor is any acid that releases hydrogen ions to trigger the reaction of the exothermic reaction component. Acid precursors include triacetin (1,2,3-triacetoxypropane), methyl acetate, HCl, and acetic acid. In at least one embodiment, the acid precursor is triacetin. In at least one embodiment of the present disclosure, the acid precursor is acetic acid. However, when microwaves are used to trigger the exothermic reaction component, no acid precursor is required, or a reduced amount of acid precursor can be applied.

As used throughout the disclosure, the exothermic reaction component includes one or more redox reactants that exothermically react to produce heat and increase pressure. Exothermic reaction components include urea, sodium hypochlorite, ammonium containing compounds, and nitrite containing compounds. In at least one embodiment, the exothermic reaction component includes ammonium containing compounds. Ammonium containing compounds include ammonium chloride, ammonium bromide, ammonium nitrate, ammonium sulfate, ammonium carbonate, and ammonium hydroxide.

In at least one embodiment, the exothermic reaction component includes nitrite containing compounds. Nitrite containing compounds include sodium nitrite and potassium nitrite. In at least one embodiment, the exothermic reaction component includes both ammonium containing compounds and nitrite containing compounds. In at least one embodiment, the ammonium containing compound is ammonium chloride, $NH_4Cl$. In at least one embodiment, the nitrite containing compound is sodium nitrite, $NaNO_2$.

In at least one embodiment, the exothermic reaction component includes two redox reactants: $NH_4Cl$ and $NaNO_2$, which react according to the following:

$$NH_4Cl + NaNO_2 \xrightarrow{(H^+ \, and/or \, \Delta H \, and/or \, microwaves)} N_2 + NaCl + 2\,H_2O + Heat. \qquad \text{Equation 1}$$

In some embodiments, the concentration of the ammonium containing compound can be from about 0.5 molar to about 10 molar. For example, in some exothermic reaction components, the concentration of $NH_4Cl$ can be from 0.5 molar to 10 molar. In some embodiments, the concentration of the nitrite containing compound can be from about 0.05 to about 12 molar. For example, in some exothermic reaction components, the concentration of $NaNO_2$ can be from about 0.05 molar to about 12 molar. In some embodiments, the optimum ratio of the ammonium containing compound to the nitrite containing compound is about 1:1, however, in other embodiments, the ratio can be from about 1:1 to about 1:3, by molar basis. In some embodiments, the desired pH of the exothermic reaction component before triggering using microwaves is between about 10 and about 14. Any one of or any combination of acid, heat, and microwaves can be used to trigger the exothermic reaction component.

In some embodiments, the pH of the exothermic reaction component before triggering with microwaves is between about 10 and about 12. Without being bound by any theory or explanation, it is believed that the reaction is mainly triggered by excitation that is provided by microwave radiation to the exothermic reaction component. It is believed that heating does not play a major role in the triggering of the reaction.

In some embodiments, when the exothermic reaction component is initially prepared, the pH will be between about 5 and about 6. A base can be used to adjust the pH to between about 10 and about 14, or to between about pH 12 and about pH 14. Any suitable, compatible base known by those of ordinary skill in the art, such as potassium hydroxide, can be used to raise the initial pH of the exothermic reaction component. In some embodiments, the pH of the exothermic reaction component is adjusted before injection into a well, reservoir, or formation. In other embodiments, the pH of the exothermic reaction component is adjusted after the exothermic reaction component is injected into a well, reservoir, or formation. The pH of the exothermic reaction component can be adjusted responsive to the temperature of a reservoir or other surrounding environment to prevent premature reaction of the exothermic reaction component.

In a reaction of the exothermic reaction component according to Equation 1, generated gas contributes to the reduction of the viscosity of the residual viscous material, or contributes to the generation of a pressure pulse. A reaction of the exothermic reaction component in a confined environment, such as a high pressure reservoir or contained vessel, will favor creating a pressure pulse when the exothermic reaction component is quickly triggered by microwaves. Microwave power of about 1,000 Watts (W) or greater is enough to trigger the reaction of the exothermic reaction component.

The exothermic reaction component is triggered to react. In at least one embodiment, the exothermic reaction component is triggered within the fractures.

In at least one embodiment, the cleanup fluid is introduced to the fractures following the hydraulic fracturing operation. Dual-string coiled tubing can be used to introduce the exothermic reaction component and the acid precursor to the wellbore. In at least one embodiment, the exothermic reaction component includes $NH_4Cl$ and $NaNO_2$. An optional acid precursor is acetic acid. The acetic acid is mixed with $NH_4Cl$ and is injected in parallel with the $NaNO_2$, using different sides of the dual-string coiled tubing. However in other embodiments in which microwave triggering of the exothermic reaction component is used, no acid precursor is needed. The exothermic reaction component and the optional acid precursor mix within the fractures. Similarly, an optional base, such as potassium hydroxide, can be added by way of a dual-string coiled tubing in parallel with components of the exothermic reaction component.

Pressure Pulse

In an alternate embodiment of the present disclosure, a method to increase a stimulated reservoir volume in a gas-containing formation is provided. The gas-containing formation can include a tight gas formation, an unconventional gas formation, and a shale gas formation. Formations include Indiana limestone, Beria sandstone, and shale. The stimulated reservoir volume is the volume surrounding a wellbore in a reservoir that has been fractured to increase well production. Stimulated reservoir volume is a concept useful to describe the volume of a fracture network. The method to increase a stimulated reservoir volume can be performed regardless of the reservoir pressure in the gas-containing formation. The method to increase a stimulated reservoir volume can be performed in a gas-containing formation having a reservoir pressure in a range of atmospheric pressure to about 10,000 psig.

In the method of the present disclosure, the exothermic reaction component is mixed to achieve a pre-selected solution pH. The pre-selected solution pH is in a range of about 6 to about 9.5, alternately about 6.5 to about 9, alternatively about 10 to about 14, alternatively about 10 to about 12. The exothermic reaction component is mixed with the viscous fluid component and the proppant component to form the fracturing fluid. The fracturing fluid is injected into the wellbore in the gas-containing formation to create fractures and the proppant(s) holds open the fractures. The exothermic reaction component reacts and upon reaction generates a pressure pulse that creates auxiliary fractures. Fracturing fluid is used in a primary operation to create fractures. The auxiliary fractures extend from the fractures caused by the fracturing fluid to create a fracture network. The fracture network increases the stimulated reservoir volume. In some embodiments, the injection of any one of or any combination of the hydraulic fracturing fluid including the viscous fluid component, the proppant component, the overflush component, and the exothermic reaction component does not generate foam or introduce foam into the hydraulic formation including the hydraulic fractures.

In at least one embodiment, the temperature at which the exothermic reaction component reacts is affected by the pre-selected solution pH and an initial pressure. In at least one embodiment, the concentration(s) and the pH of the exothermic reaction component is designed to not react or to delay the reaction upon reaching the wellbore or reservoir temperature. The initial pressure is the pressure of the exothermic reaction component just prior to the reaction of the exothermic reaction component. Increased pre-selected solution pH can increase the temperature that triggers the reaction of the exothermic reaction component, preventing the wellbore temperature from prematurely triggering the reaction.

Under suitable temperate and pressure conditions, such as for example those shown in FIG. 5, the exothermic reaction component generates a pressure pulse and heat. The pressure pulse is generated within milliseconds from the start of the reaction. The pressure pulse is at a pressure between about 500 psi and about 50,000 psi, alternately between about 500 psi and about 20,000 psi, alternately between about 500 psi and about 15,000 psi, alternately between about 1,000 psi and about 10,000 psi, alternately between about 1,000 psi and about 5,000 psi, and alternately between about 5,000 psi and about 10,000 psi.

The pressure pulse creates auxiliary fractures. The auxiliary fractures extend from the point of reaction in all directions without causing damage to the wellbore or the fractures created due to the step of injecting the fracturing fluid. The pressure pulse creates the auxiliary fractures regardless of the reservoir pressure. The pressure of the pressure pulse is affected by the initial reservoir pressure, the concentration of the exothermic reaction component, and the solution volume. In addition to the pressure pulse, the reaction of the exothermic reaction component releases heat. The heat released by the reaction causes a sharp increase in the temperature of the formation, which causes thermal fracturing. Thus, the heat released by the exothermic reaction component contributes to the creation of the auxiliary fractures. The exothermic reaction component allows for a high degree of customization to meet the demands of the formation and fracturing conditions.

In at least one embodiment, the exothermic reaction component is injected into the wellbore in the absence of the viscous fluid component and the proppant component and allowed to react to generate the pressure pulse.

In at least one embodiment, the method to increase a stimulated reservoir volume also performs the method to cleanup a residual viscous material as described previously. The method of the present disclosure can be adjusted to meet the needs of the fracturing operation. In one embodiment, the fracturing fluid includes an exothermic reaction component that reacts to both create auxiliary fractures and to cleanup residual viscous material from the fracturing fluid. In one embodiment of the present disclosure, the fracturing fluid includes an exothermic reaction component that reacts to only create auxiliary fractures. In one embodiment, the fracturing fluid includes an exothermic reaction component that reacts to only cleanup residual viscous material.

Fractures created by a pressure pulse created by an exothermic reaction component can be longitudinal and perpendicular with respect to a vertical openhole wellbore. The fractures can be spatially-oriented according to a predetermined in situ orientation, or the fractures can be non-spatially-oriented.

In some embodiments, no viscous fluid component, such as, for example plant gum, is required to be used in combination with the exothermic reaction component(s). In some embodiments, the exothermic reaction creates a large amount of nitrogen gas quickly, which is produced to create pressure for the pressure pulse to create fractures in a hydrocarbon-bearing formation. In some embodiments, the pH of the exothermic reaction component aqueous solution is controlled to be greater than pH 4, or greater than pH 5, or greater than pH 6, or greater than pH 7, or greater than pH 8, or greater than pH 9, or at about pH 11.

Embodiments of exothermic reaction components show compatibility with viscous fluid components, such as for example a cross-linked gel. In one embodiment, a fracturing fluid with a viscous fluid component, an exothermic reaction component, and a proppant component are prepared and show compatibility. Heat generated by the exothermic reaction can reduce the viscosity of the viscous fluid component to produce a reduced viscosity material, without injecting a viscosity breaker. The exothermic reaction component and this type of treatment can clean-up the fractures after a fracturing job.

A method to increase the stimulated reservoir volume of a gas-containing formation is described. The method to increase a stimulated reservoir volume can be performed in oil-containing formations, water-containing formations, or any other formation. In at least one embodiment of the present disclosure, the method to increase a stimulated reservoir volume can be performed to create fractures and auxiliary fractures in cement.

Well Stimulation

In certain embodiments, a non-acidic well stimulation composition is provided for use in hydrocarbon-bearing formations, such as sandstone formations. The composition includes an ammonium containing compound; a nitrite containing compound; and a non-acidic well stimulation fluid. An exothermic reaction between the ammonium containing compound and the nitrite containing compound can be triggered by microwaves in situ to produce heat for the non-acidic well stimulation fluid to react with a hydrocarbon-bearing formation.

Non-acidic well stimulation methods are provided. In some embodiments, the method comprises the steps of: injecting an aqueous preflush solution into the formation that includes a heat generating composition. The heat generating composition includes ammonium and nitrite ion containing compounds. In some embodiments, at least one of the ammonium and nitrite ion containing compounds is optionally encapsulated with an erodible coating such that reaction between the ammonium and nitrite ions is delayed until the ammonium and nitrite containing compounds have migrated to a suitably deep level within the formation. In other embodiments, the pH of the aqueous preflush solution is adjusted upwardly to delay the exothermic reaction until the ammonium and nitrite containing compounds have migrated to within the formation and are treated with microwaves in situ.

In some embodiments, the method includes the step of injecting into the formation an acid-free well stimulation composition that includes sodium hydroxide, ammonium containing compounds and nitrite containing compounds, where the well stimulation composition is operable to dissolve at least a portion of the hydrocarbon-bearing formation, such as a sandstone formation. An exothermic reaction which produces heat and gas is triggered in situ using microwaves. After allowing the acid-free well stimulation composition to react with the formation, the method then includes the step of injecting an overflush solution that includes brine into the formation such that the overflush solution stops the reaction between the well stimulation composition and the formation. The ammonium containing compound and nitrite containing compound present in the preflush and acid-free well stimulation compositions are operable to react to produce heat.

Typically, the non-acidic stimulation fluid includes an alkali or alkaline earth hydroxide, such as sodium hydroxide. In certain embodiments, the non-acidic stimulation fluid primarily includes sodium hydroxide. The sodium hydroxide solution reacts with the sandstone formation much more slowly than typical acidic stimulation fluids, enabling deeper penetration of the stimulation fluid into the sandstone formation. Additionally, the sodium hydroxide solution does not react with the formation in a way that leads to the formation of precipitates during reaction.

As used here, "preflush" refers to a fluid that is pumped into the wellbore ahead of a main stimulation treatment fluid to displace ions, such as potassium, sodium, and calcium. In certain embodiments, the preflush is operable to minimize the possibility adverse reactions with the treating fluids and the formation of unwanted precipitates, which can lead to clogging of the pores of the foundation.

The preflush solution can include a heat generating composition that is supplied to the formation for the purpose of increasing the temperature within the formation. Exemplary compounds present in the heat generating composition include ammonium ions and nitrite ions (for example, present as $NH_4Cl$ and $NaNO_2$). In certain embodiments, the preflush brine solution can include one or more halide-containing brines. In one embodiment, the preflush brine can be aqueous ammonium chloride, having for example, a concentration range of between about 1 and 20% by weight, alternatively between about 5 to 10% by weight, alternatively between 5-7% by weight, alternatively between 7-9% by weight, or alternatively between 9-10% by weight. In certain embodiments, prior to injection into the formation, the preflush brine solution can be preheated to a temperature of up to about 70° C. (158° F.), alternatively up to about 50° C. (122° F.), alternatively between about 20° C. (68° F.) and 60° C. (140° F.). Upon delivery of the heat generating compounds to the formation, the reactants react to form heat and gas upon the application of microwaves in situ.

As used here, "overflush" refers to a fluid that is pumped into the wellbore after the stimulation fluid has been injected into the formation and the reaction between the stimulation fluid and the formation is complete. The overflush fluid can also, in certain embodiments, help to maintain a low pH environment in the near-wellbore formation, which can help to prevent precipitation of reaction products as the treatment fluids are removed from the formation during the flow back phase of the treatment.

As used here, "brine" refers to a solid-free aqueous solution that includes dissolved inorganic salts. As used here, "non-acidic stimulation fluid" refers to a stimulation fluid that is acid-free that has a pH that is greater than 7. The terms 'non-acidic" and "acid-free" may be used interchangeably here. In certain embodiments, the non-acidic stimulation fluid includes sodium hydroxide.

As used here, when it is disclosed that the well stimulation fluid includes sodium hydroxide, it is understood that in certain embodiments other hydroxide compounds, for example, calcium hydroxide or potassium hydroxide, may be substituted.

In certain embodiments, the use of a preflush composition that includes heat generating compounds is operable to increase the downhole temperature by at least about 50° C. (122° F.), alternatively at least about 75° C. (167° F.), alternatively at least about 100° C. (212° F.).

In certain embodiments, when the heat generating compounds can be incorporated with the non-acidic well stimulation fluid, the presence of the sodium hydroxide helps to prevent a premature reaction between the ammonium and nitrite containing compounds. The reactants can reach the formation temperature without the high temperatures within the formation causing the reaction between the heat generating compounds. The application of microwaves in situ can trigger the exothermic reaction of the exothermic reaction component.

The reaction of silicon oxide ($SiO_2$) with sodium hydroxide is provided as follows by Equation 2:

$$SiO_2 + 2NaOH \rightarrow Na_2SiO_3 + H_2O. \qquad \text{Equation 2:}$$

The reaction between the sodium hydroxide and the sandstone formation is generally slow and does not include precipitation of any interfering compounds, as is the case with the use of HF stimulation fluids. At increased temperatures, the reaction between the sodium hydroxide and the formation is facilitated and more efficient, and in certain preferred embodiments heat can be separately supplied to the site of the reaction by other known means.

In one embodiment of the disclosure, the non-acidic stimulation fluid can include sodium hydroxide. In certain embodiments, the concentration of the sodium hydroxide solution can be in a range of between about 2 and 20% by weight, 5 to 15% by weight, alternatively between 5-8% by weight, alternatively between 8-12% by weight, or alternatively between 12-15% by weight. The sodium hydroxide solution is generally injected into the sandstone formation directly following the injection of the preflush brine, and before the injection of the overflush brine. In certain embodiments, the sodium hydroxide solution is allowed to react with the sandstone formation for up to about 1 hour, alternatively for between about 1 and 2 hours, alternatively between about 2 and 3 hours, or alternatively for more than about 3 hours.

It is understood, however, that the time during which the non-acidic stimulation fluid is allowed to react with the formation can be varied from minutes (for example, 5 minutes, 15 minutes, or 30 minutes) up to several hours (for example, up to about 12 hours), depending upon the concentration of the stimulation fluid and the type of formation that is being treated. In certain embodiments, prior to injection into the formation, the non-acidic stimulation fluid can be preheated, for example to a temperature of up to about 70° C. (158° F.), alternatively up to about 50° C. (122° F.), alternatively between about 20° C. (68° F.) and 60° C. (140° F.), prior to injection into the formation.

In certain embodiments, the overflush brine solution can be selected from a group of halide-containing brines. Upon the injection of the overflush brine solution into the formation, the reaction between the non-acidic stimulation fluid and the sandstone formation is terminated, ending penetration of the stimulation fluid into the formation. In one embodiment, the overflush brine can be aqueous ammonium chloride in a concentration range of between about 1 and 5% by weight, alternatively between about 5 to 10% by weight, alternatively between 5-7% by weight, alternatively between 7-9% by weight, or alternatively between 9-10% by weight, or alternatively between about 10 and 15% by weight. In certain embodiments, the preflush and overflush brines may have the same composition.

In certain embodiments, the non-acidic well stimulation techniques and compounds described here can be coupled with traditional hydraulic fracturing techniques. In certain embodiments, the non-acidic stimulation fluids can be used to treat solids.

In one embodiment, a method is provided for injecting a stimulation fluid into a sandstone formation. The method utilizes the step of the co-injection of the heat generating composition. In certain embodiments, the heat generating composition takes advantage of an oxidation-reduction reaction (also referred to here as a ReDox composition) for the in-situ generation of heat within the formation to provide a means for heating the stimulation fluid. Additionally, the reaction of components of the heat generating composition can generate substantial volumes of nitrogen gas and create an area localized pressure within the formation, which in turn can cause micro-fracturing of the nearby strata to improve permeability of near fracture surface of the formation.

In certain embodiments, the method can include the step of supplying a composition that includes compounds that include ammonium ions and nitrite ions to the formation, which can react exothermically and generate heat and gaseous nitrogen. In certain embodiments, all or a portion of the oxidation-reduction composition can be incorporated with fracturing fluids and injected during a hydraulic fracturing treatment. In certain embodiments, a portion of the heat generating composition can be injected into the formation along with or after the injection of the preflush and ahead of the non-acidic stimulation fluid.

The in-situ generation of heat and nitrogen (and resulting increase in pressure within the formation at the reaction site), can increase the permeability of certain gas formations. The heat and gas that are generated by the reaction can cause tensile and thermal fractures within the hydraulically induced and within the existing fractures in the formation. It is understood that the generation of the microfractures within the formation may depend on the type of formation being treated. This, coupled with the administration of the non-acidic well stimulation fluid described here (such as a sodium hydroxide based fluid), can result in the increased production from the formation as both the heat generating composition and the non-acidic well stimulation fluid act on the formation in a manner that results in increased permeability.

In certain embodiments, the heat generating composition releases significant quantities of nitrogen gas within the formation, which then migrates into the fractures within the formation to form additional microfractures within the formation. The heat generating composition, such as a composition that includes an ammonium compound, a nitrite compound and optionally an activator, are injected to the formation where it migrates within large fractures. Upon reaction, the injected fluids produce heat and nitrogen gas, causing microfractures to develop within the formation, providing pathways for migration of the non-acidic stimulation fluid to enter the formation and for the hydrocarbon molecules trapped within the formation to migrate out of the formation and be recovered.

In yet another embodiment, a composition that includes ammonium ions, nitrite ions, and an optional activator can be injected into the formation with the preflush brine, where at least one of the ammonium ions and/or nitrite ions is optionally encapsulated. It is understood that ammonium ions and nitrite ions as used here refers to an ionic compound where a counter ion is included. For example, ammonium ions can be supplied as ammonium chloride. Polymers, that are hydrated, may be used to coat at least one reactant, for example $NaNO_2$. Exemplary hydrated polymers can include guar, chitosan and polyvinyl alcohol. Other binders, such as carboxymethyl cellulose or xanthan, may also be used as coating material, such as for at least one reactant such as $NH_4Cl$. The formation temperature will trigger the release of reactants from the coating polymer or binder. The heat of the formation, the activator, water for the formation, and the non-acidic well stimulation fluid can all play a role in the erosion or removal of the encapsulating material, which then leads to a reaction between the components and the subsequent generation of heat and gas. Upon encountering water or heat, the optional coating on one or both of the ammonium or nitrite containing compound can dissolve, allowing the reactants to react with each other.

Certain embodiments of the methods and composition described here are responsible for the release of kinetic energy and thermal energy, which is a result of the exothermic nature of the oxidation-reduction reaction. In one embodiment, for example, aqueous solutions of $NH_4Cl$ and $NaNO_2$ can be mixed in the presence of an activator to generate heat, nitrogen gas, NaCl, and water. The generation of nitrogen gas, along with the resulting increased temperature, can result in an increase in the local pressure and the development of microfractures in the tight formation. The heat that is generated, as noted previously, assists with the reaction between the non-acidic well stimulation fluid and the formation.

In certain embodiments, the reaction of ammonium ions and nitrite ions can result in the generation of at least about 50 Kcal of heat per liter of reactants, alternatively at least about 100 Kcal of heat per liter of reactants, alternatively at least about 150 Kcal of heat per liter of reactants, alternatively at least about 200 Kcal of heat per liter of reactants. It is believed that the increased pressure and temperature are sufficient to overcome the tensile strength of the formation, leading to creation of tensile microfractures in the formation.

Figure 7:
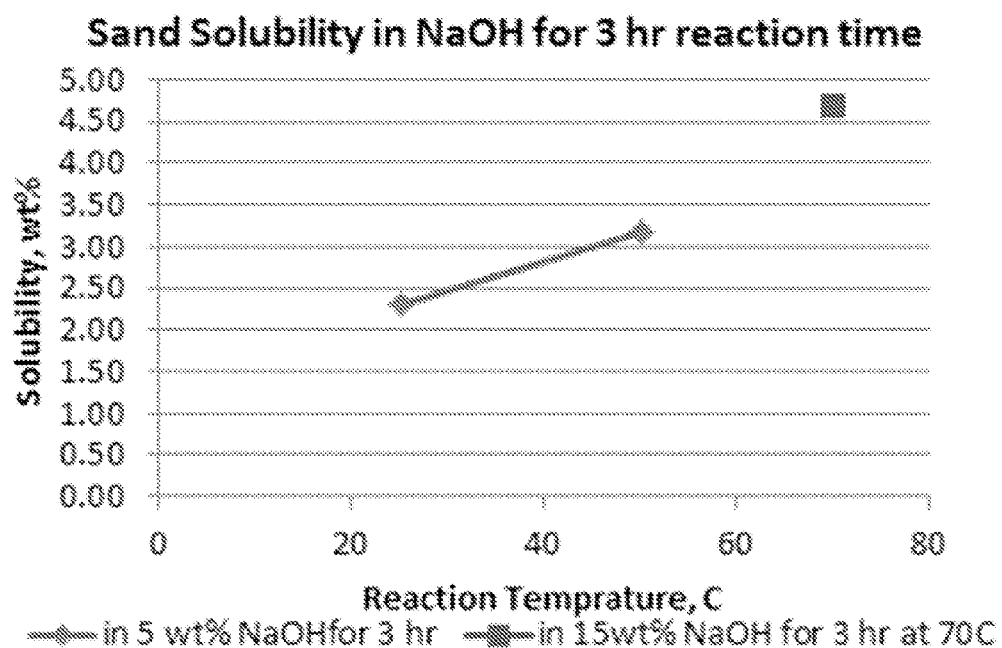
FIG. 7 is a graph showing the solubility of sandstone in sodium hydroxide as a function of temperature, demonstrating that sand has greater solubility in sodium hydroxide at higher temperatures, as well as at higher concentrations of sodium hydroxide.

As shown in FIG. 7, the solubility of sandstone in sodium hydroxide is shown as a function of temperature, demonstrating that sand has greater solubility in sodium hydroxide at higher temperatures, as well as at higher concentrations of sodium hydroxide. For example, solubility is shown to increase in a 5% NaOH solution from less than about 2.55% by weight to over 3% by weight over a 3 hour period at temperatures of about 25° C. (77° F.) and 55° C. (131° F.), respectively. A more concentrated 15% solution at a temperature of about 70° C. (158° F.) demonstrated a solubility of greater than about 4.5% by weight over a 3 hour period.

In an alternate embodiment, a multi-component composition that includes at least one ammonium containing compound and at least one nitrite containing compound can be injected into a formation, where at least one component can be encapsulated with a binder to form a solid matrix with the component. Exemplary encapsulating binders include carboxymethyl cellulose, xanthan, and like compounds. Exemplary binders are preferably reactive with water or the non-acidic well stimulation fluid, and/or heat such that upon contact with well stimulation fluid or water, or upon heating, the binder erodes or dissolves, allowing the reactants to react.

In another embodiment, a proppant can be suspended in the well stimulation fluid and can be injected into a formation. Along with the well stimulation fluid, a heat generating composition that includes at least one ammonium containing compound, at least one nitrite containing compound and optionally an activator, can be injected into the formation. In certain preferred embodiments, at least one of the ammonium containing compound and nitrite containing compound is encapsulated.

In certain embodiments, a solution that includes the ammonium and nitrite ion containing composition can be injected directly into the formation before the well stimulation fluid is injected. In certain embodiments, the ammonium and nitrite ion containing solution can be injected into the formation approximately 5 minutes before the injection of the well stimulation fluid, alternatively approximately 10 minutes before injection of the well stimulation fluid, alternatively approximately 15 minutes before injection of the well stimulation fluid. The water and the heat of the formation can facilitate erosion of the encapsulating material such that the reaction between the ammonium and nitrite containing compounds is delayed, allowing the heat generating composition to migrate and seep into the fractures within the formation. The exothermic reaction component can be triggered by microwaves in situ, once the exothermic reaction component has reached a suitable depth in the formation.

In another embodiment, an aqueous composition that includes ammonium ions, nitrite ions, a non-acidic well stimulation fluid, and optionally a buffer, is injected into a formation in a well stimulation or a hydraulic fracturing procedure.

Exemplary combinations of reactants for the heat generating composition can include: urea and sodium hypochlorite; urea and sodium nitrite; ammonium hydroxide and sodium hypochlorite; and ammonium chloride and sodium nitrite.

In certain embodiments, the heat generating composition includes equal molar amounts of the ammonium containing compound and the nitrite containing compound when they are supplied to the formation to ensure complete reaction of both components. In alternate embodiments, up to about a 5% excess of either component can be employed, however it is generally preferred that equimolar amounts are employed. Thus, in certain embodiments, the ratio of ammonium to nitrite in the compositions disclosed here can range from between about 1.1:1 to 1:1.1; alternatively between about 1.05:1 and 1:1.05, alternatively about 1:1.

In certain embodiments, the fluids used in this application can include certain chemical additives that can help to form a viscous fracturing fluid. The chemical additives can include at least one solvent and at least one polymer that is soluble in the solvent. Generally, during successful hydraulic fracturing procedures, the fracturing liquid must be removed from the well upon completion of the stimulation treatment.

The process can be both costly and time consuming. Advantageously, the compositions and methods described here are designed to cause no damage to the formation, which is a challenge considering current fracturing technologies. To overcome this problem, the compositions and methods described here advantageously utilize novel combinations of nitrogen generating chemicals as the hydraulic fracturing liquid-base. Thus, in certain embodiments, the liquids used for fracturing of the formation, which can include the nitrogen generating chemicals previously described, can be injected into the formation through the wellbore or other injection means at a sufficiently high injection rate so as to create pressures within the formation that can effectively fracture the rock or open previously existing fractures.

As the fracturing liquid seeps into the formation, these nitrogen generating chemicals can be triggered to react, generating large amounts of nitrogen gas and heat within the formation and near the newly created fracture surfaces. One advantageous triggering mechanism as here disclosed is the application of microwaves in situ to the exothermic reaction component. The generated nitrogen gas and heat can create additional microfractures and thermal fractures at or near the fracture formed as a result of the hydraulic fracturing. The reaction generates at least about 200 kilocalories (Kcal) and 50 liters (L) of nitrogen gas per liter of the heat generating chemicals that is supplied to the reaction, alternatively about 225 Kcal and 60 L of nitrogen per liter of the heat generating chemicals supplied to the reaction.

In certain embodiments, the heat generating compounds can be supplied to the formation separately, for either the preflush fluids or the well stimulation fluids. For example, in certain embodiments, the preflush fluids that include brine and an ammonium containing compound can be injected into the formation. Following injection of the preflush fluids, a nitrite containing compound can be injected into the formation and the ammonium and nitrite compounds can react to produce heat and nitrogen gas. Alternately, in another embodiment, the preflush fluids can include brine and a nitrite containing compound. These preflush fluids are injected into the formation, followed by the injection of an ammonium containing compound, allowing the nitrite and ammonium compounds to react to produce heat and nitrogen gas.

In certain embodiments, a polymer can be mixed with ammonium solution, nitrite solution, or a combination thereof, and can serve as the base fluid being injected in the formation. Thus, in certain embodiments, the non-acidic stimulation fluid can include a solvent base, such as water, a polymer viscosifying agent, and an ammonium containing compound. In such an embodiment, following the injection of the fracturing fluid, a nitrite containing compound can be injected into the formation.

In an alternate embodiment, the non-acidic well stimulation fluid can include a solvent base, such as water, a polymer viscosifying agent, and a nitrite containing compound. In such an embodiment, following the injection of the non-acidic well stimulation fluid, an ammonium containing compound would then be injected into the formation.

Advantageously, in contrast to some currently employed stimulation methods, the methods and compositions described here do not produce any damaging by-products as a result of the in-situ reaction. As a result, following the stimulation procedure, no clean-up procedure is required. Thus, through the creation of the synthetic sweetspots, maximum enhancement of gas production with a minimal creation of damaging waste products is provided.

In certain embodiments, the methods and compositions described here advantageously and unexpectedly eliminate formation damage that can be caused by a fracturing gel, water blockage, and/or condensate banking. These conditions result in reduced permeability of fluids within the formation, and subsequently lead to poor production of a well. The generation of the synthetic sweet spot according to the methods described here avoids these problems.

In certain embodiments, the methods and compositions described here advantageously and unexpectedly can be used to stimulate injector and producer wells, particularly in a sandstone formation.

The methods and compositions provided here solve several problems that are frequently encountered during the construction of commercial wells in formations where acid stimulation is utilized.

First, problems associated with damage to the formation caused by current strong acid stimulation methods can be eliminated. For example, the methods and compositions described here, advantageously help to eliminate the production of precipitates that can be locked near a recently created fracture surface by creating many tensile fractures near the fracture surface such that any filtrate readily flows through these fractures toward the well.

Although the present disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed here as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the disclosure pertains, except when these references contradict the statements made here.

As used here and in the appended claims, the words "comprise," "has," and "include" and all grammatical variations thereof are each intended to have an open, non-limiting meaning that does not exclude additional elements or steps.

As used here, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A method for triggering an exothermic reaction of an exothermic reaction component, the method comprising the steps of:
    mixing the exothermic reaction component in an aqueous solution to achieve a pre-selected solution pH, where the aqueous solution operably delays triggering of the exothermic reaction upon reaching a pre-determined temperature of a hydrocarbon-bearing formation;
    disposing the exothermic reaction component within the hydrocarbon-bearing formation to rest at a first temperature;
    applying microwaves to the exothermic reaction component, where the microwaves are operable to trigger the exothermic reaction of the exothermic reaction component via microwave excitation of the exothermic reaction component at a triggering temperature at the pre-selected solution pH in less than about 1 minute of applying the microwave excitation at about at least 1,000 Watts, where the triggering temperature is less than a temperature required at the pre-selected solution pH for triggering the exothermic reaction component without microwave excitation, and where the triggering temperature is about the same as the first temperature at which the exothermic reaction component rests; and
    generating heat and gas in situ by the exothermic reaction to increase pressure and temperature of the hydrocarbon-bearing formation proximate the exothermic reaction component.

2. The method according to claim 1, further comprising the steps of:
    mixing the exothermic reaction component in the aqueous solution, such that the exothermic reaction component is operable to react to generate a pressure pulse;
    mixing the aqueous solution with a viscous fluid component to form a fracturing fluid, the viscous fluid component operable to fracture the hydrocarbon-bearing formation to create fractures, and the fracturing fluid further comprising a proppant component, the proppant component carried to the fractures by the viscous fluid component, the proppant component comprises a proppant, and the proppant operable to hold open the fractures;
    injecting the fracturing fluid into a wellbore in the hydrocarbon-bearing formation to create the fractures; and
    generating the pressure pulse by applying microwaves to the exothermic reaction component, such that the pressure pulse is operable to create auxiliary fractures, where the auxiliary fractures create a fracture network, where the fracture network increases stimulated reservoir volume.

3. The method according to claim 2, where the exothermic reaction component comprises an ammonium containing compound and a nitrite containing compound.

4. The method according to claim 2, where the pressure pulse is between about 500 psi and about 50,000 psi.

5. The method according to claim 2, where the pressure pulse creates the auxiliary fractures in less than about 10 seconds.

6. The method according to claim 2, where the pressure pulse creates the auxiliary fractures in less than about 5 seconds.

7. The method according to claim 1, further comprising the step of:
    fracturing the hydrocarbon-bearing formation with a fracturing fluid to generate fractures, the fracturing fluid comprising:
        a viscous fluid component, the viscous fluid component operable to fracture the hydrocarbon-bearing formation to create the fractures leaving behind a residual viscous material in the fractures, the viscous fluid component having a viscosity;
        a proppant component, the proppant component comprising a proppant, the proppant operable to hold open the fractures, where the proppant component is carried to the fractures by the viscous fluid component; and
        a cleanup fluid, the cleanup fluid comprising:
            the exothermic reaction component,
    where the step of generating heat and gas in situ by the exothermic reaction to increase the pressure and temperature of the hydrocarbon-bearing formation proximate the exothermic reaction component is operable to reduce a viscosity of the residual viscous material to create a reduced viscosity material, the reduced viscosity material operable to flow from the hydrocarbon-bearing formation.

8. The method according to claim 7, where the step of fracturing the hydrocarbon-bearing formation with a fracturing fluid to generate fractures further comprises the step of forming auxiliary fractures and a fracture network.

9. The method according to claim 7, where the cleanup fluid comprises an ammonium containing compound and a nitrite containing compound.

10. The method according to claim 9, where the cleanup fluid comprises ammonium chloride and the nitrite containing compound comprises sodium nitrite.

11. The method according to claim 1, further comprising the steps of:
    injecting an aqueous preflush solution into the hydrocarbon-bearing formation comprising the exothermic reaction component, the exothermic reaction component comprising ammonium and nitrite ion containing compounds, where at least one of the ammonium and nitrite ion containing compounds is encapsulated with an erodible coating such that reaction between the ammonium and nitrite ion containing compounds is delayed as the ammonium and nitrite containing compounds migrate to within the hydrocarbon-bearing formation;
    applying microwaves to the aqueous preflush solution to trigger the exothermic reaction of the exothermic reaction component within the aqueous preflush solution;
    injecting into the hydrocarbon-bearing formation an acid-free well stimulation composition comprising sodium hydroxide, ammonium containing compounds and nitrite containing compounds, said acid-free well stimulation composition being operable to dissolve at least a portion of the hydrocarbon-bearing formation; and
    after allowing the acid-free well stimulation composition to react with the hydrocarbon-bearing formation, then injecting an overflush solution comprising brine into the hydrocarbon-bearing formation such that the overflush solution stops the reaction between the acid-free well stimulation composition and the hydrocarbon-bearing formation.

12. The method according to claim 11, where the molar ratio of the ammonium containing compound to the nitrite containing compound is between about 1.1:1 and 1:1.1 in the aqueous preflush solution and the acid-free well stimulation composition.

13. The method according to claim 11, where at least one of the ammonium containing compound and the nitrite containing compound in the aqueous preflush solution comprise a polymer coating selected from the group consisting of: guar, chitosan, and polyvinyl alcohol.

14. The method according to claim 11, where the erodible coating encapsulating at least one of the ammonium containing compound and the nitrite containing compound in the aqueous preflush solution is selected from the group consisting of: carboxymethyl cellulose and xanthan.

15. The method according to claim 11, where the ammonium containing compound comprises ammonium chloride in the aqueous preflush solution and the acid-free well stimulation composition.

16. The method according to claim 11, where the nitrite containing compound comprises sodium nitrite in the aqueous preflush solution and the acid-free well stimulation composition.

17. The method according to claim 11, where the reaction between the ammonium containing compounds and nitrite containing compounds in the aqueous preflush solution is operable to increase temperature within the hydrocarbon-bearing formation by between about 50° C. (122° F.) and 100° C. (212° F.).

18. The method according to claim 1, where the exothermic reaction component comprises an ammonium containing compound and a nitrite containing compound.

19. The method according to claim 18, where the ammonium containing compound is selected from the group consisting of: ammonium chloride, ammonium bromide, ammonium nitrate, ammonium sulfate, ammonium carbonate, and ammonium hydroxide.

20. The method according to claim 18, where the nitrite containing compound is selected from the group consisting of: sodium nitrite and potassium nitrite.

21. The method according to claim 18, where the ammonium containing compound comprises ammonium chloride and the nitrite containing compound comprises sodium nitrite.

22. The method according to claim 18, where concentration of the ammonium containing compound is between about 0.5 molar and about 10 molar.

23. The method according to claim 18, where the concentration of the nitrite containing compound is between about 0.05 molar and about 12 molar.

24. The method according to claim 18, where ratio of the ammonium containing compound to the nitrite containing compound is about 1:1 on a molar basis.

25. The method according to claim 1, where the pre-selected solution pH is between about 10 and about 14.

26. The method according to claim 1, where the pre-selected solution pH is between about 10 and about 12.

27. The method according to claim 1, where the pre-determined temperature of the hydrocarbon-bearing formation is in a range between about 48.8° C. (120° F.) and about 121.1° C. (250° F.).

28. The method according to claim 1, where the triggering temperature is reduced by up to about 60% compared to the temperature required at the pre-selected solution pH for triggering the exothermic reaction component without microwave.

29. A system for triggering an exothermic reaction of an exothermic reaction component in a hydrocarbon-bearing reservoir, the system comprising:

a temperature detecting device operable to detect an in situ temperature of the hydrocarbon-bearing reservoir;
an exothermic reaction component in an aqueous solution with a pre-selected solution pH, where the aqueous solution operably delays triggering of the exothermic reaction upon reaching the in situ temperature of the hydrocarbon-bearing reservoir; and
a microwave application unit for in situ application of microwaves to the exothermic reaction component, where the microwaves are operable to trigger the exothermic reaction of the exothermic reaction component via microwave excitation of the exothermic reaction component at a triggering temperature at the pre-selected solution pH in less than about 1 minute of applying the microwave excitation at about at least 1,000 Watts, where the triggering temperature is less than a temperature required at the pre-selected solution pH for triggering the exothermic reaction component without microwave excitation, and where the triggering temperature is about the same temperature as the exothermic reaction component in situ, the exothermic reaction generating heat and gas in situ by the exothermic reaction to increase pressure and temperature of the hydrocarbon-bearing reservoir.

30. The system according to claim 29, where the exothermic reaction component comprises an ammonium containing compound and a nitrite containing compound.

31. The system according to claim 30, where the ammonium containing compound is selected from the group consisting of: ammonium chloride, ammonium bromide, ammonium nitrate, ammonium sulfate, ammonium carbonate, and ammonium hydroxide.

32. The system according to claim 30, where the nitrite containing compound is selected from the group consisting of: sodium nitrite and potassium nitrite.

33. The system according to claim 30, where the ammonium containing compound comprises ammonium chloride and the nitrite containing compound comprises sodium nitrite.

34. The system according to claim 30, where the concentration of the ammonium containing compound is between about 0.5 molar and about 10 molar.

35. The system according to claim 30, where the concentration of the nitrite containing compound is between about 0.05 molar and about 12 molar.

36. The system according to claim 30, where the ratio of the ammonium containing compound to the nitrite containing compound is about 1:1 on a molar basis.

37. The system according to claim 29, where the pre-selected solution pH is between about 10 and about 14.

38. The system according to claim 29, where the pre-selected solution pH is between about 10 and about 12.

39. The system according to claim 29, where the triggering temperature is reduced by up to about 60% compared to the temperature required at the pre-selected solution pH for triggering the exothermic reaction component without microwave.

* * * * *